United States Patent
Gustafson et al.

(10) Patent No.: US 10,276,055 B2
(45) Date of Patent: Apr. 30, 2019

(54) ESSAY ANALYTICS SYSTEM AND METHODS

(71) Applicant: Mattersight Corporation, Chicago, IL (US)

(72) Inventors: David Gustafson, Lake Bluff, IL (US); Christopher Danson, Austin, TX (US)

(73) Assignee: MATTERSIGHT CORPORATION, Chicago, IL (US)

( * ) Notice: Subject to any disclaimer, the term of this patent is extended or adjusted under 35 U.S.C. 154(b) by 0 days.

(21) Appl. No.: 14/286,653

(22) Filed: May 23, 2014

(65) Prior Publication Data

US 2015/0339939 A1 Nov. 26, 2015

(51) Int. Cl.
*G09B 7/02* (2006.01)

(52) U.S. Cl.
CPC ..................... *G09B 7/02* (2013.01)

(58) Field of Classification Search
CPC ... G09B 7/02; G09B 7/00; G09B 5/00; G09B 7/04
USPC .......... 434/262, 322, 323, 350, 353
See application file for complete search history.

(56) References Cited

U.S. PATENT DOCUMENTS

| | | | |
|---|---|---|---|
| 6,181,909 B1 | 1/2001 | Burstein et al. | |
| 6,386,883 B2 | 5/2002 | Siefert | |
| 7,013,259 B1 | 3/2006 | Polanyi et al. | |
| 8,094,803 B2 * | 1/2012 | Danson | G10L 15/1822 379/265.02 |
| 8,452,225 B2 | 5/2013 | Burstein et al. | |
| 8,463,594 B2 | 6/2013 | Au | |
| 8,472,861 B2 | 6/2013 | Andreyev et al. | |
| 8,577,898 B2 | 11/2013 | Al Badrashiny et al. | |
| 8,608,477 B2 | 12/2013 | Maguire et al. | |
| 8,632,344 B2 | 1/2014 | Attali | |
| 2003/0046263 A1 * | 3/2003 | Castellanos | G06F 17/30719 |
| 2005/0209907 A1 * | 9/2005 | Williams | 705/10 |
| 2006/0105303 A1 | 5/2006 | Ames et al. | |
| 2007/0238084 A1 * | 10/2007 | Maguire | G09B 19/06 434/353 |
| 2008/0182229 A1 | 7/2008 | Kwack et al. | |
| 2010/0332217 A1 | 12/2010 | Wintner et al. | |
| 2011/0144971 A1 | 6/2011 | Danielson | |
| 2012/0329029 A1 * | 12/2012 | Rauta | 434/350 |

(Continued)

FOREIGN PATENT DOCUMENTS

AU 2004218661 4/2005

OTHER PUBLICATIONS

François Mairesse, et al., "Using Linguistic Cues for the Automatic Recognition of Personality in Conversation and Text," *Journal of Artificial Intelligence Research 1* (XXXX) X-X, pp. 1-44.

(Continued)

*Primary Examiner* — Jerry-Daryl Fletcher
(74) *Attorney, Agent, or Firm* — Haynes and Boone, LLP

(57) ABSTRACT

The methods, apparatus, and systems described herein evaluate written essays and determine student attributes from the essays. The methods include receiving an essay, identifying keywords in text of the essay associated with one or more student metrics, outputting a score for the essay for at least one student metric using a linguistic-based psychological behavioral model, and recommending teaching methods based on the score.

24 Claims, 18 Drawing Sheets

(56) References Cited

U.S. PATENT DOCUMENTS

2014/0046891 A1* 2/2014 Banas ........................... 706/46
2014/0355749 A1* 12/2014 Conway et al. ........... 379/265.1

OTHER PUBLICATIONS

Carolyn P. Rosé, et al., "A Hybrid Approach to Content Analysis for Automatic Essay Grading," *University of Pittsburgh*, rosecp@pitt.edu,, 3 pages.

Kenton W. Murray, et al., "Automatic Essay Scoring," http://www.kaggle.com, pp. 1-8.

Semire Dikli, "An Overview of Automated Scoring of Essays," *The Journal of Technology, Learning, and Assessment*, vol. 5, No. 1, Aug. 2006, pp. 1-35.

Melissa C. O'Conner, et al, "Big Five personality predictors of post-secondary academic performance," www.elsevier.com/locate/paid, (2007), pp. 971-990.

Jing Liu, et al., "Affective Computing Applications in Distance Education," International Conference on Education Technology and Information System (ICETIS), 2013, *Atlantis Press*, pp. 927-930.

Lynn Streeter, et al., "Pearson's Automated Scoring of Writing, Speaking, and Mathematics," *Pearson*, May 2011, pp. 1-23.

Darrell M. West, et al., "Data Analytics and the Assessment of Student Writing," *Data Center for Technology Innovation at Brookings*, Sep. 2013, pp. 1-15.

"Automated essay scoring," http://en.wikipedia.org/wiki/Automated_essay_scoring, Oct. 14, 2013, pp. 1-6.

Peter W. Foltz, et al., "Automated Essay Scoring: Applications to Educational Technology," http://www-psych.nmsu.edu/-pfoltz/reprints/Edmedia99.html, Oct. 14, 2013, pp. 1-7.

* cited by examiner

FIG. 2

Motivation Comparison

| Label | Main Sample | ABC Sample |
|---|---|---|
| Achievement | 21% | 59% |
| Enjoyment | 45% | 13% |
| Values | 31% | 26% |
| Neutral | 3% | 3% |

FIG. 16

Outlook Comparison

| Label | Main Sample | ABC Sample |
|---|---|---|
| Strongly Positive | 1% | 0% |
| Positive | 37% | 77% |
| Weakly Positive | 5% | 0% |
| Neutral | 10% | 10% |
| Weakly Negative | 5% | 8% |
| Negative | 42% | 5% |
| Strongly Negative | 7% | 0% |

FIG. 17

Confidence Comparison

| Label | Main Sample | ABC Sample |
|---|---|---|
| Low | 9% | 5% |
| High | 12% | 15% |
| Neutral | 79% | 80% |

FIG. 18

ESSAY ANALYTICS SYSTEM AND METHODS

TECHNICAL FIELD

The present disclosure generally relates to methods, apparatus, and systems that analyze written essays, and more particularly determine a student profile from the essays and in some embodiments recommend or provide teaching instructions or methods based on the scoring of one or more essays.

BACKGROUND OF THE DISCLOSURE

Essay writing is a significant element for expressing oneself and an important indicator of linguistic competency and knowledge of an author. In particular, essays are considered by many researchers as the most useful tool to assess learning outcomes, implying the ability to recall, organize and integrate ideas, the ability to express oneself in writing and the ability to supply merely than identify interpretation and application of data. Essay writing has been an important subject in the educational system across cultures and throughout history.

Essays are often evaluated to determine a student's writing skills, identify areas for improvement, and measure progress over time. A teacher or other reviewer reads and grades the text, and then provides feedback to the student as needed. The essay may be graded on factors such as sentence structure, word usage, punctuation, grammar, cohesion, spelling, and organizational structure. The feedback typically includes generalized comments and an overall characterization of the essay, such as "your essay is well developed."

Typical essay evaluations do not identify student attributes that can be used to improve future instruction, nor do they provide tips on how to better communicate with the student to improve their essay writing. Thus, improved systems and methods in essay evaluation are needed.

SUMMARY

The present disclosure seeks to analyze student essays to determine student attributes. The present methods extract student attribute information from the essays and use it to improve future student instruction. In various embodiments, the student attribute information includes behavioral characteristics and non-cognitive characteristics.

In one aspect, the present disclosure relates to a system adapted evaluate a written essay. The system includes a node that includes a processor and a non-transitory computer readable medium operably coupled thereto, and the non-transitory computer readable medium includes a plurality of instructions stored in association therewith that are accessible to, and executable by, the processor. The plurality of instructions include instructions that, when executed, receive an essay; instructions that, when executed, apply a linguistic-based psychological behavioral model to text of the essay to output a score for at least one student metric; and instructions that, when executed, provide teaching instructions based on the score.

In a second aspect, the present disclosure relates a method for evaluating a written essay. The method includes receiving, by one or more processors, an essay; identifying, by the one or more processors, keywords in text of the essay associated with one or more student metrics; outputting, by the one or more processors, a score for the essay for at least one student metric using a linguistic-based psychological behavioral model; and recommending, by the one or more processors, teaching methods based on the score.

In a third aspect, the present disclosure relates to a non-transitory computer readable medium that includes a plurality of instructions, which in response to a computer system, cause the computer system to perform a method. The method includes receiving an essay; searching for keywords in text of the essay associated with one or more student metrics; outputting a score for the essay for at least one student metric using a linguistic-based psychological behavioral model; displaying a score for the at least one student metric; and providing teaching instructions based on the score.

In a fourth aspect, the present disclosure relates to a system adapted to evaluate an essay. The system includes a storage device storing a non-transitory computer readable program; and a processor executing the non-transitory computer readable program. The processor includes a data module adapted to receive an essay; a scoring module adapted to apply a linguistic-based psychological behavioral model to text of the essay to output a score for at least one student metric; and a display module adapted to display the score.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2 is a sample student profile report according to various aspects of the present disclosure.

FIG. 16 illustrates the comparison in motivation between strongly performing students and general students according to various aspects of the present disclosure.

FIG. 17 illustrates the comparison in outlook between strongly performing students and general students according to various aspects of the present disclosure.

FIG. 18 illustrates the comparison in confidence between strongly performing students and general students according to various aspects of the present disclosure.

DETAILED DESCRIPTION OF THE PREFERRED EMBODIMENTS

Figure 1:
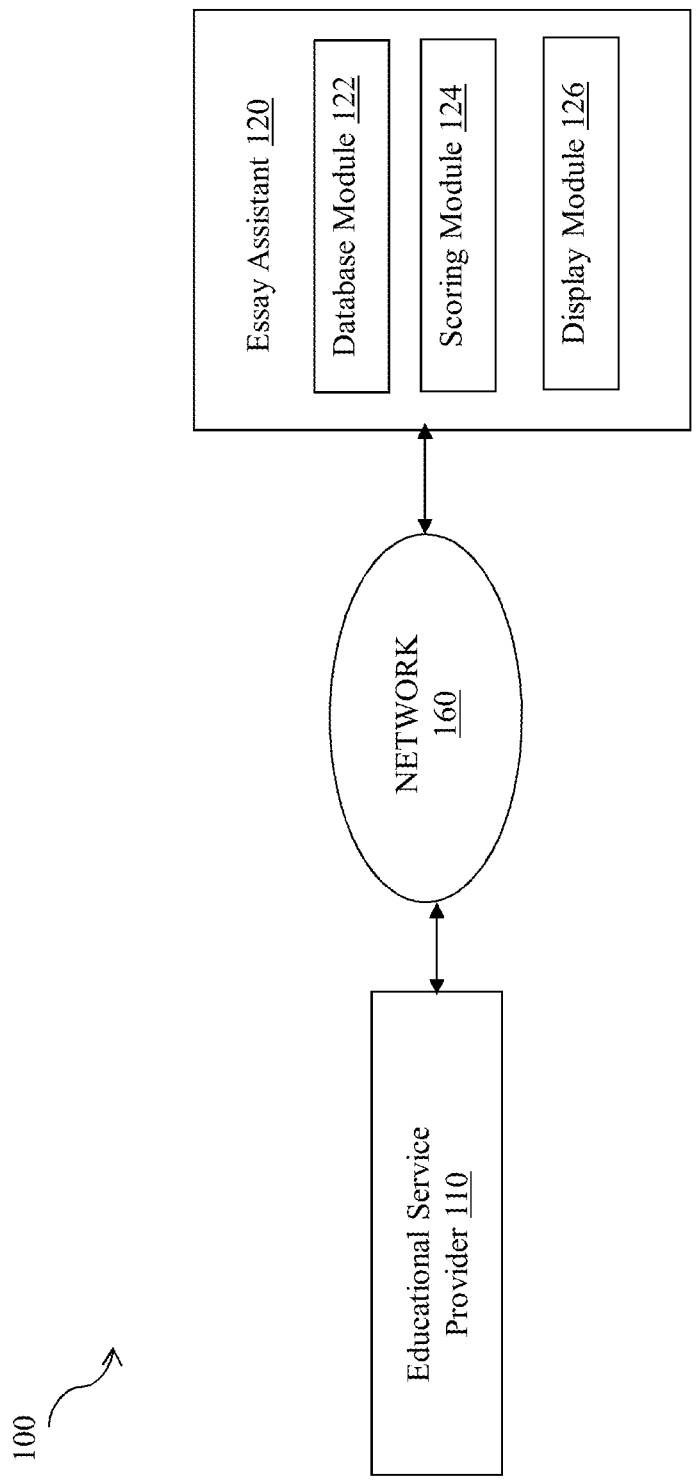
FIG. 1 is a block diagram of an embodiment of a system for evaluating a written essay according to various aspects of the present disclosure.

The present disclosure advantageously analyzes written essays by students and determines student attributes from the analysis. A student, as the term is used herein, can include any person seeking to improve their essay-writing skills, such as a child in school, young adult in college or graduate school, or even an adult worker. In one preferred embodiment, student refers to school students of any age. Once the student attributes are identified, the attributes can be used to improve future instruction of the student. In various embodiments, a linguistic-based psychological behavioral model is applied to the text of the student essays. The model outputs a score for a student metric. Student metrics include behavioral characteristics expressed in the essay and non-cognitive characteristics expressed in the essay. Examples of student metrics include writer's voice, writer's motivation, outlook, confidence, intensity, enthusiasm, and engagement. The methods include receiving an essay, identifying keywords in text of the essay associated with one or more student metrics, outputting a score for the essay for at least one student metric, and recommending teaching methods based on the score.

Systems and apparatuses for carrying out these methods are also part of the present disclosure. An exemplary system to evaluate a written essay includes, for example, a node including a processor and a non-transitory computer readable medium operably coupled thereto, the non-transitory computer readable medium comprising a plurality of instructions stored in association therewith that are accessible to, and executable by, the processor, where the plurality of instructions includes instructions that when executed, receive an essay, apply linguistic analysis to text of the essay to output a score for at least one student metric, and provide teaching instructions based on the score.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 depicts a schematic block diagram of an essay analytics system 100 in accordance with one or more embodiments of the present disclosure. The system 100 includes educational service provider 110 and essay assistant 120 in communication over a network 160.

The educational service provider 110 generally includes a number of functional components for collecting and providing essays to the essay assistant 120. For example, the educational service provider 110 generally includes one or more processing devices such as servers (not shown), each having one or more processors. The servers can be configured to send information (e.g., electronic files such as essays) to be displayed on one or more devices. The educational service provider 110 also generally includes one or more data storage devices (e.g., memory, etc.) (not shown) that are in communication with the servers, and could include a relational database, or other suitable data storage devices. The data storage devices may be configured to host data about the courses offered by the service provider 110 (e.g., the course frameworks, educational materials to be consumed by the student, records of assessments, background reading materials or information, ancillary materials, etc.).

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. Any suitable type of network to connect the interviewer and candidate may be used.

In some cases, the educational service provider 110 may be part of (or associated with) a traditional "bricks and mortar" educational institution (e.g., a grade school, vocational school, university or college), another entity that provides educational services (e.g., an online university, a company that specializes in offering training courses, an organization that has a training department, continuing education class, or employer training program, etc.), or may be an independent service provider (e.g., for providing individual electronic learning). In various embodiments, the educational service provider 110 provides a platform for evaluating essays.

In one or more embodiments, the essay assistant 120 is a networked system (e.g., an Internet web-based system accessible by educational service provider 110) for outputting a score and evaluating student essays. As shown in FIG. 1, the essay assistant 120 includes database module 122, scoring module 124, and display module 126. The database module 122 is adapted to receive a student essay. In some embodiments, the essay is received from the educational service provider 110 and in other embodiments, the essay can be received directly from a student or instructor. The database module 122 may be used to store various information or data required by the scoring module 124 and display module 126.

The scoring module 124 is used to analyze and output a score for the student essay. The scoring module 124 is adapted to apply linguistic algorithms to the text of the essay and to output a score. A linguistic algorithm(s) is typically created by linguistic analysts and such algorithm(s) are typically trained using previously analyzed essays. In one embodiment, the analyst(s) can review previous essays by previous students and manually label keywords or terms that are relevant to an identified student attribute. The algorithm is trained to check for those keywords and the number of times they are used in the essay. A more sophisticated algorithm may be used that additionally checks for use of the keywords in context. One master algorithm containing many specific algorithms may also be used. The algorithms may be, e.g., specific to the educational service provider 110, specific to a particular topic or educational course, or be general to all educational content.

In one embodiment, each essay is evaluated for a number of student attributes or metrics. The scores may then be aggregated by student, by class, by instructor, or by a certain time period, as well as any combination of the foregoing. To output a score for the different student metrics, the text of the student essay is subject to a linguistic-based psychological behavioral model to assess student characteristics in various preferred embodiments.

In one embodiment, data is mined for behavioral signifiers associated with a linguistic-based psychological behavioral model. In particular, the scoring module 124 searches for and identifies text-based keywords (i.e., behavioral signifiers) relevant to a predetermined psychological behavioral model. In a preferred embodiment, multiple channels (also referred to as multi-channels) are mined for such behavioral signifiers.

It is well known that certain psychological behavioral models have been developed as tools, and any such behavioral model available to those of ordinary skill in the art will be suitable for use in connection with the disclosure. These models are used to attempt to evaluate and understand how and/or why one person or a group of people interacts with another person or group of people. One example is the Big Five inventory model (©2000) by UC Berkeley psychologist Oliver D. John, Ph.D. Another is the Process Communication Model™ developed by Dr. Taibi Kahler. Exemplary personality types, which will vary from model to model and can be selected as desired for a given application or across all applications, might include, for example: Thoughts, Opinions, Reactions, Emotions. These models generally presuppose that all people fall primarily into one of the enumerated basic personality types. In some cases, the models categorize each person as one of these four types (or some other number of personality types), all people have parts of each of the types within them. Each of the types may learn differently, may be motivated differently, may communicate differently, and may have a different sequence of negative behaviors in which they engage under certain circumstances, e.g., when they are in distress. Importantly, each personality type may respond positively or negatively to communications that include tones or messages commonly associated with another of the personality types. Thus, an understanding of a user's personality type typically offers guidance as to how the user will react or respond to different situations.

In some embodiments, the scoring module 124 evaluates a plurality of student metrics or attributes, which can be used to improve future instruction of the student and to better communicate with the student, such as while providing instruction. For example, the student attribute can include writer's voice, motivation, outlook, confidence, intensity, enthusiasm, engagement, or any combination thereof. Some metrics, like outlook, are calibrated on a sliding scale so that their scores indicate a level of the metric found in the essay. Other metrics, like engagement, measure only whether a behavior is absent or present in the essay. Each metric can come with a recommendation for how a school, teacher, or parent can use the metric to best engage with and encourage the student preferably regarding writing instruction.

The writer's voice captures a student's writing style, and is tied to a set of characteristics and strengths displayed in the essay. Each essay can be labeled with a primary and secondary writer's voice to provide more information about the student for the student profile. The score of the writer's voice may be compassionate, logical, conscientious, or creative.

A score of "compassionate" means the student used caring language that demonstrated a people-oriented attitude. The language used by the student was rich with sensory descriptions and language that indicated a concern for others. Examples of "compassionate" words or phrases include, without limitation, "care," "love," "sorry," "hope," "express concern," and "get better."

A score of "logical" means that the student's essay contained language that indicated that the writer was logical and rational in the execution of his or her essay. The writing was well-supported, clear, and well-reasoned. Examples of "logical" words or phrases include, without limitation, "reason," "proof," "judgment," "argument," "hypothesis," and "based on the evidence."

A score of "conscientious" means that the student used language that demonstrated a well-developed sense of right and wrong. His or her language indicated that the student is principled and desires to take a stance on an issue. Examples of "conscientious" words or phrases include, without limitation, "clearly," "absolutely," "right," "wrong," and "believe."

A score of "creative" means that the student used language that was imaginative, creative, and playful. The student demonstrated a natural ability to tell a creative story that is original and extemporaneous. Examples of "creative" words or phrases include, without limitation, "original," "imagine," "vision," "make-believe," "fabrication," "fantasy," and "fun."

Motivation represents the student's primary driver or the primary emotions that drive the student. This metric uses evidence in the student's writing to identify what he or she believes is important, or what incentives resonate most with him or her. Each essay can be labeled with primary and second motivation to provide a richer student profile. The score of motivation can be enjoyment, achievement, or values.

A score of "enjoyment" means the student is oriented toward the more exciting, interesting, or entertaining facets of life. The student uses language that indicates that he or she strongly likes or dislikes things. Examples of words or phrases that indicate "enjoyment" include, without limitation, "hate," "love," "fun," "exciting," and "thrills."

A score of "achievement" means the student is oriented toward success and uses language that indicates that he or she is motivated by setting goals and working towards completing those goals. Examples of words or phrases that indicate "achievement" include, without limitation, "win," "lose," "goal," "action," "motivate," "complete," "finish line," and "work towards."

A score of "values" means the student is motivated by a strong feeling of what is inherently right or wrong. The student uses language that indicates that he or she is driven by a strong moral code, sometimes resulting in judgments of other moral codes. Examples of words or phrases that indicate "values" include, without limitation, "moral," "ethics," "acceptable," "unacceptable," "right," "wrong," "goodness," "kindness," and "evil."

Outlook captures the overall tone that a student chose to use in an essay. The score of outlook may be strongly positive, positive, weakly positive, neutral, weakly negative, negative, or strongly negative. A score of "strongly positive" shows that the essay has a highly positive tone. The amount of positive language vastly overshadows the amount of negative language. A score of "positive" shows that the essay contains both positive and negative language, but there is clearly more positive language than negative language present. A score of "weakly positive" shows that the essay has a modestly positive tone. There is only moderately more positive language then negative language. A score of "neutral" shows that the student either took a mainly objective or procedural tone or alternated between a negative and positive tone. A score of "weakly negative" shows there is only moderately more negative language than positive language in the essay. A score of "negative" shows that the essay contains both negative language and positive language, but there is clearly more negative than positive language present. A score of "strongly negative" shows that the essay has a highly negative tone. The amount of negative language vastly overshadows the amount of positive language.

Confidence is a measure of the student's expression of competence and effectiveness in his or her ideas and actions. The score of confidence can be low, neutral, or high. A score of "low" demonstrates that the student expressed feelings of or related an experience in which he or she felt inadequate, ineffective, incompetent, uncertain, or indecisive. A score of "neutral" demonstrates that the student either did not explicitly express confidence or a lack of confidence, or expressed both confidence and a lack of confidence, balancing out to neutral. A score of "high" demonstrates that the student expressed feelings of or related an experience in which he or she felt self-satisfied, effective, competent, certain, or determined.

Intensity captures when a student broaches a topic that is difficult or uncomfortable. This includes when a student uses language to describe a subject in harsh terms. The score of intensity may be low, medium, or high. A score of "low" means the essay contained little or no intense language, and the student did not use harsh words often or more than briefly mention a difficult topic. A score of "medium" means the essay contained a moderate amount of intense language. The student used harsh words more than a few times or devoted a moderate amount of space to a difficult topic. A score of "high" means that the essay contained a substantial amount of intense language. The student often used harsh words or frequently or exclusively discussed difficult topics.

Enthusiasm captures language that indicates a high level of interest or excitement. This includes students expressing interest or excitement in an object, idea, or activity. Enthusiasm is either present or absent. When present, the student used language indicative of a high level of interest or excitement around the topic at hand at least once. When absent, the student did not choose to use language indicative of a high level of interest or excitement.

Engagement captures when a student demonstrates an ability to put him or herself in another's shoes. This includes when a student identifies with or imagines another person's emotions or difficulties, expresses sympathy towards another person, or expressly acknowledges another person's view or position. Engagement is either present or absent. When it is present, the student identified with another person, expressed sympathy, or acknowledged a different point of view at least once in the essay. When it is absent, the student did not explicitly identify with another person, express sympathy, or acknowledge a different point of view.

Figure 2:
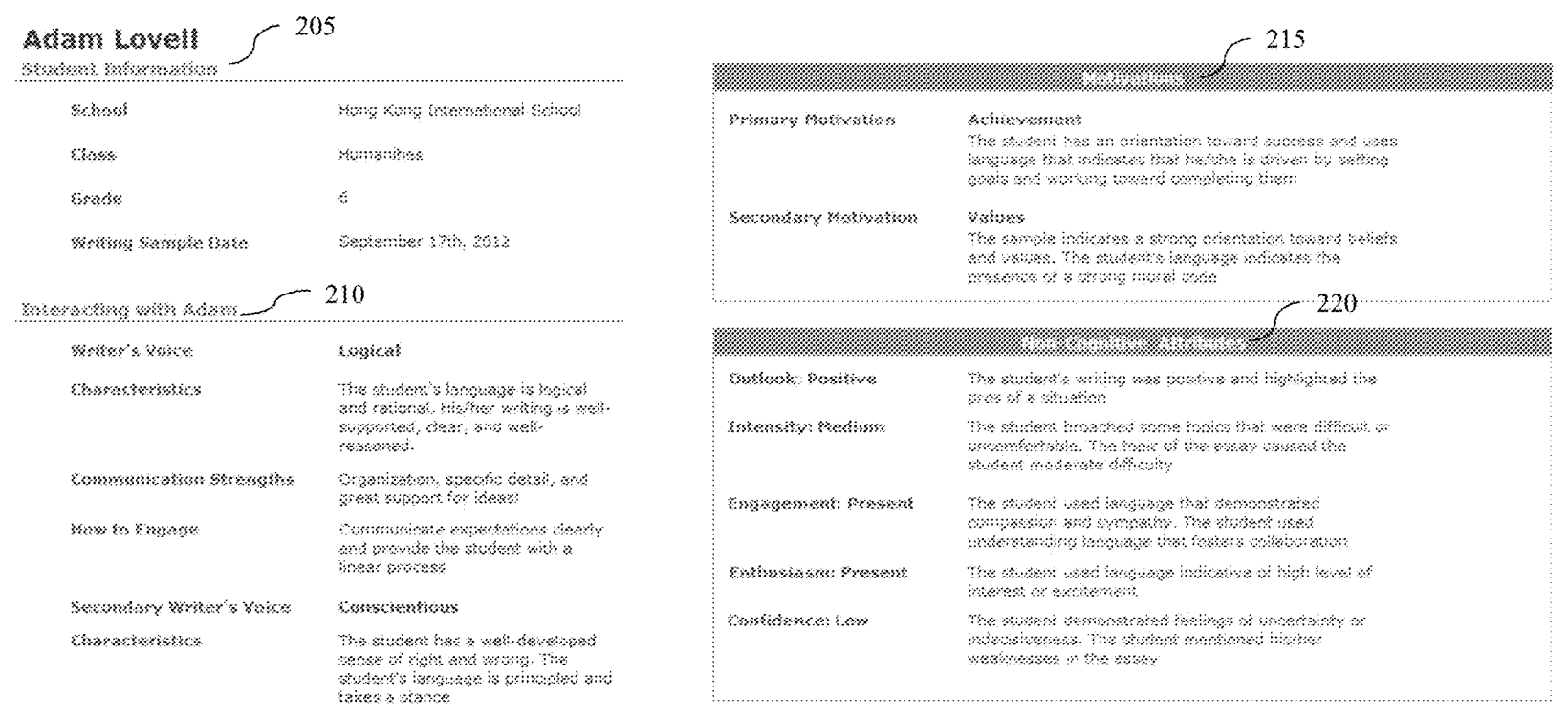

The scoring module 124 may output a score for each of writer's voice, motivation, outlook, intensity, engagement, enthusiasm, and confidence. FIG. 2 is an example of a report that may be provided. The exemplary report includes a student information section 205, information on interacting with the student 210 (including recommendations on how to best engage with the student), information on motivation of the student 215, and non-cognitive attributes of the student 220. As explained above, the score for the student metric can be a category or yes/no. For example, for engagement, the score is either yes (the student demonstrates engagement), or no (the student does not demonstrate engagement). The score for writer's voice, however, is a category. A report can, for example, include one or more of the exemplary report sections.

The scoring module 124 may be configured to generate different scores at different times. For example, the scores may be updated at a given interval such as daily, weekly, monthly, or at other predefined intervals. In other examples, the scoring module 124 may be configured to generate scores upon request. This allows the scoring module 124 to provide a relatively current snapshot of the scores for students in the system, such as after completing each writing assignment. The scoring module 124 is also configured to aggregate scores by student, by essay, by teacher, or any combination thereof.

In various embodiments, the scoring module 124 also receives historical data from the database module 122. The historical data may include historical student scores and the corresponding data associated with one or more students who had previously provided one or more selected essays. In some embodiments, historical data may be obtained from various databases and data sources. For example, the historical data may be obtained from a single institution (e.g., educational service provider), a plurality of institutions, or one or more third party data services.

After generation of the scores, the scores may be provided to the display module 126. The display module 126 is configured to generate one or more visual displays to convey the scores to the school, student, or instructor. In various embodiments, the display module 126 may be configured to generate at least one visual display showing the student scores for that selected student.

Figure 3:
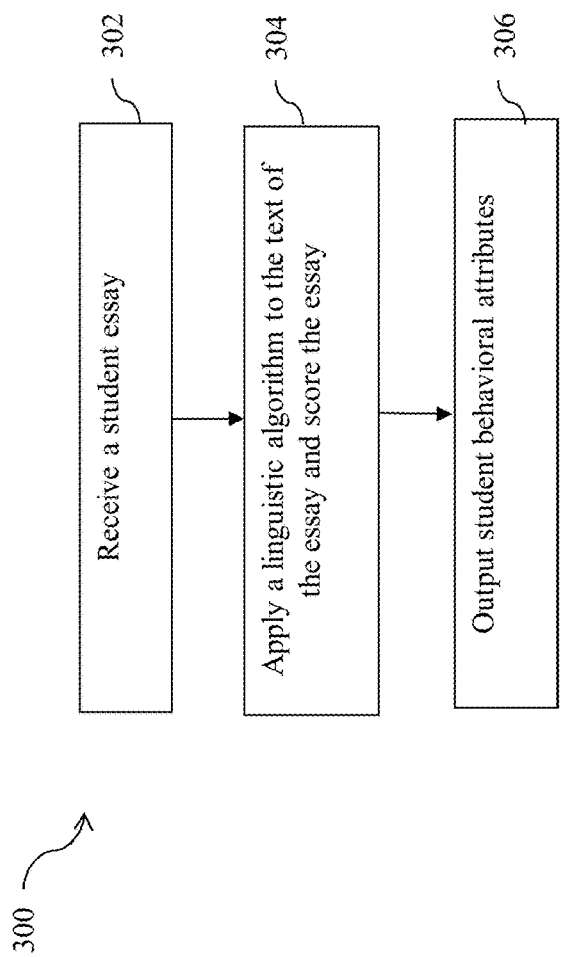
FIG. 3 is a flowchart illustrating a preferred method for evaluating a written essay according to aspects of the present disclosure.

An exemplary method 300 of evaluating an essay according to the disclosure will now be described with respect to FIG. 3. At step 302, the database module 122 receives an essay written by a student. In various embodiments, the essay is received from the educational service provider 110, but in other embodiments, the essay may be received from a student, either directly or as a copy of what is sent to the instructor or educational service provider 110. The database module 122 may store the essay for later use.

At step 304, at least one linguistic algorithm is applied to the text of the essay and a score is generated. The algorithm looks for specific terms, keywords and phrases (i.e., groups of keywords) that indicate a student metric (e.g., writer's voice, motivation, outlook, intensity, engagement, enthusiasm, confidence, etc.) and the density of those terms in the communication.

In various embodiments, these terms, phrases, or keywords are stored in a library or libraries that are accessed by the scoring module 124. The library may separate the keywords, terms, and phrases into different student metrics. Keywords are the words previously determined to indicate the specific characteristic in the essay. Each keyword may have respective aliases, which are essentially synonyms of keywords. Synonyms of the keywords may be identified and also stored in the library. The aliases are typically treated as interchangeable with the keywords from a scoring perspective, but in one embodiment aliases can be treated as not interchangeable if specific words, terms, or phrases are expected to be used. Aliases may also be given relative scores next to a keyword, such as an alias valued at 0.6 or 1.2 of a keyword valued at 1. Also, due to the flexibility of the methods described herein, additional words, terms, and/or phrases may be added to the library at any time, such as based on additional essays. For example, when it becomes apparent that another word is used frequently and is just as effective as the associated keyword, the library may be updated to include this word as an acceptable alias, or may upgrade the relative value of that alias to 1 compared to the keyword if the algorithm tracks relative values.

The essays are evaluated by the scoring module 124. The scoring module 124 uses linguistic algorithms that are configured to detect keywords, terms, and phrases in the communications, and the communications are evaluated based on the number of word hits. The score can be assigned using any suitable grading scale such as a binary scale (e.g., yes or no) or other scale created to rank the student's performance in a certain category. The present disclosure includes the creation of one or more linguistic algorithms specifically directed to the essay scoring and teaching also presently disclosed herein using known techniques for algorithm development.

At step 306, the scoring module 124 outputs the scores for the student metrics measured. The scores may be displayed by the display module 126. For example, scoring module 124 can output scores related to student behavioral and non-cognitive attributes. Once the scores are output, they can be used to recommend teaching methods for the student.

In various embodiments, the actual grade received on the essay is taken and analyzed. For example, the grade can be correlated with one or more student metrics to predict student outcomes, such as grades or placement.

Figure 4:
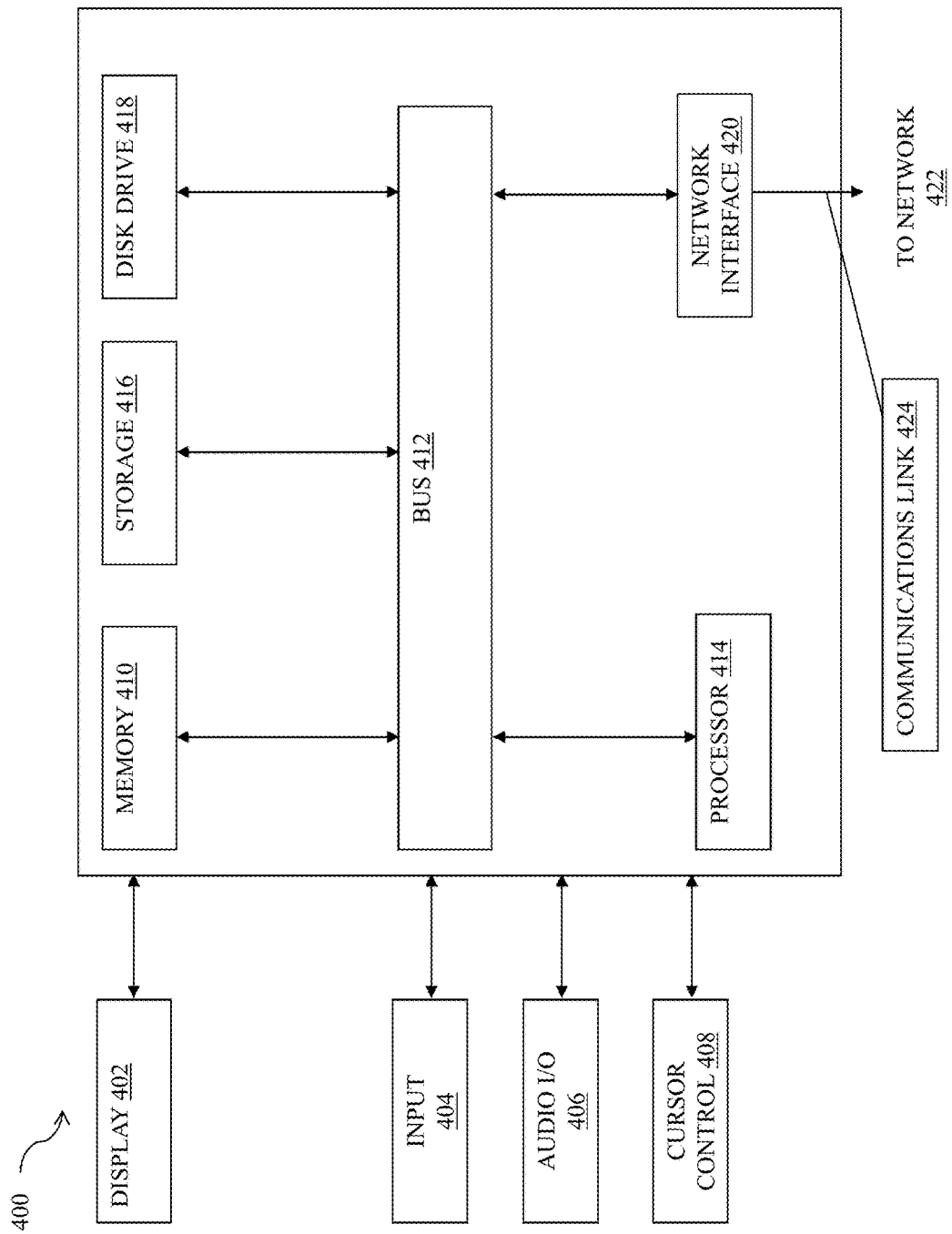
FIG. 4 is a block diagram of a computer system suitable for implementing one or more components in FIG. 1 according to an embodiment of the present disclosure.

FIG. 4 is a block diagram of a computer system 400 suitable for implementing devices in one or more embodiments of the present disclosure, including the education service provider 110 and the essay assistant 120. It should be appreciated that the education service provider 110 and the essay assistant 120 may be implemented as computer system 400 in a manner as follows.

Computer system 400 includes a bus 412 or other communication mechanism for communicating information data, signals, and information between various components of computer system 400. Components include an input/output (I/O) component 404 that processes a user (i.e., sender, recipient, service provider) action, such as selecting keys from a keypad/keyboard, selecting one or more buttons or links, etc., and sends a corresponding signal to bus 412. I/O component 404 may also include an output component, such as a display 402 and a cursor control 408 (such as a keyboard, keypad, mouse, etc.). An optional audio input/output component 406 may also be included to allow a user to use voice for inputting information by converting audio signals. Audio I/O component 406 may allow the user to hear audio. A transceiver or network interface 420 transmits and receives signals between computer system 400 and other devices, such as another user device, a merchant server, or a service provider server via network 422. In one embodiment, the transmission is wireless, although other transmission mediums and methods may also be suitable. A processor 414, which can be a micro-controller, digital signal processor (DSP), or other processing component, processes these various signals, such as for display on computer system 400 or transmission to other devices via a communication link 424. Processor 414 may also control transmission of information, such as cookies or IP addresses, to other devices.

Components of computer system 400 also include a system memory component 410 (e.g., RAM), a static storage component 416 (e.g., ROM), and/or a disk drive 418. Computer system 400 performs specific operations by processor 414 and other components by executing one or more sequences of instructions contained in system memory component 410. Logic may be encoded in a computer readable medium, which may refer to any medium that participates in providing instructions to processor 414 for execution. Such a medium may take many forms, including but not limited to, non-volatile media, volatile media, and transmission media. In various implementations, non-volatile media includes optical or magnetic disks, volatile media includes dynamic memory, such as system memory component 410, and transmission media includes coaxial cables, copper wire, and fiber optics, including wires that comprise bus 412. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 424 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

EXAMPLES

The present disclosure is further defined by reference to the following example, describing in detail a study used to evaluate student essays. This example is used for illustrative purposes only, and is not to be construed as limiting the appended claims.

Method

The text of 2000 student essays generated for a Writing Advanced Placement course analyzed by the Educational Records Bureau (ERB) was evaluated. The psychological linguistic model applied to the essays to detect student behavioral attributes was tailored to the essays. A model was built by reviewing randomly selected essays to develop and validate thousands of individual algorithms that evaluate student essays. The essays were evaluated on seven dimensions: writer's voice, motivation, outlook, confidence, intensity, enthusiasm, and engagement. Each dimension was made up of hundreds of linguistic algorithms and rules.

Results

Figure 5:
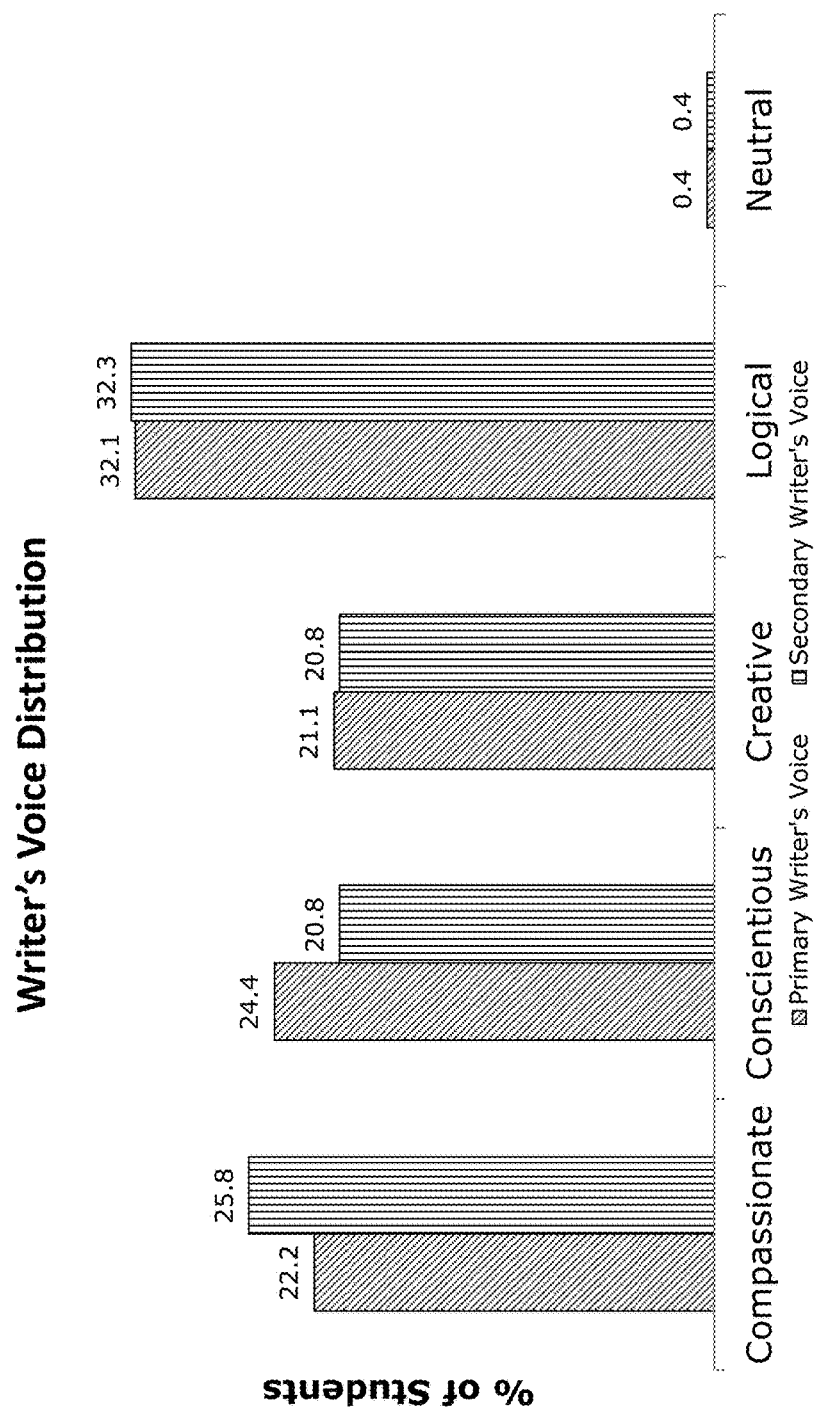
FIG. 5 is a bar graph illustrating distribution of writer's voice for student essays evaluated according to aspects of the present disclosure.

The writer's voice distribution for the student essays is shown in FIG. 5. As can be seen, the writer's voice distribution (both primary and secondary writer's voice) in the essay samples were for the most part evenly distributed. The slight lean towards logical may be attributed to the fact that the students were encouraged to plan and organize their writing throughout the allotted time.

Figure 6:
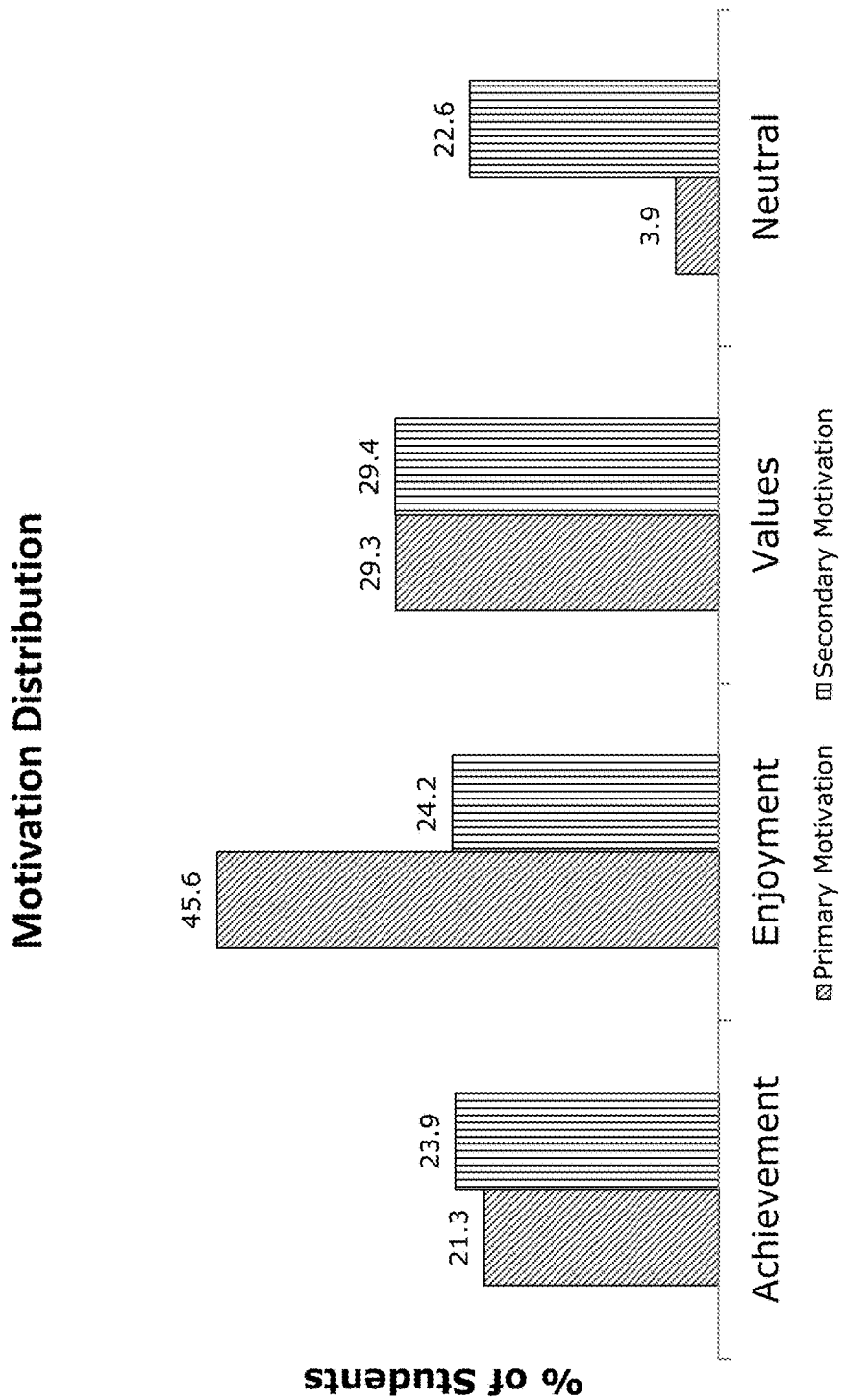
FIG. 6 is a bar graph illustrating distribution of motivation for student essays evaluated according to various aspects of the present disclosure.

The motivation distribution for the student essays is shown in FIG. 6. The distribution of motivation was relatively evenly distributed, with the exception of the enjoyment motivation. Linguistic experts noted that the distribution of enjoyment could be higher due to the range of ages in the sample. Enjoyment was more prevalent among lower testing levels (i.e., those younger in age).

Figure 7:
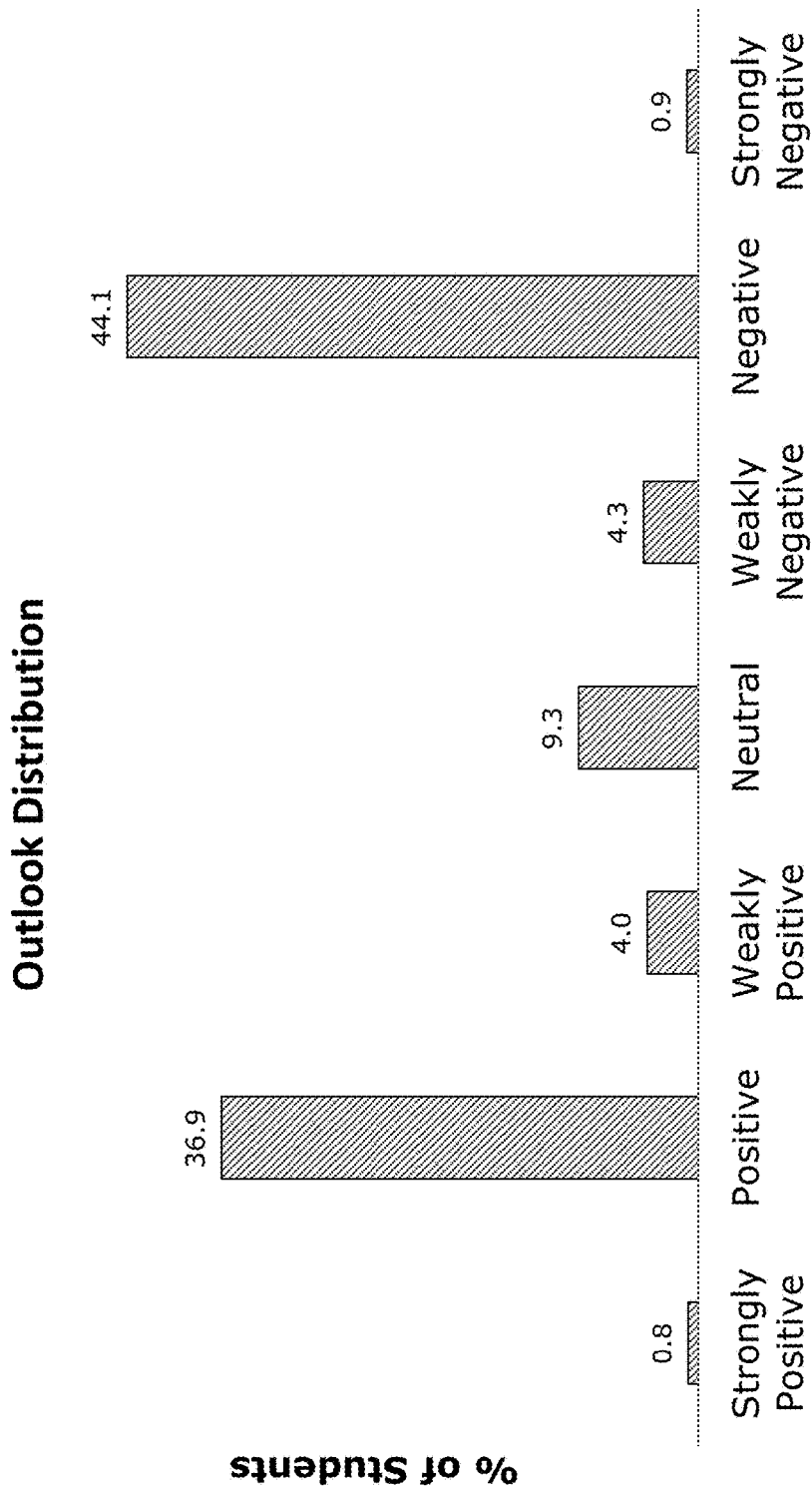
FIG. 7 is a bar graph illustrating distribution of outlook for student essays evaluated according to various aspects of the present disclosure.

The distribution of outlook for the student essays is shown in FIG. 7. The distribution of positive and negative outlooks is fairly balanced, with a slight lean towards negative outlook. Linguistic experts noted that many of the prompts solicited responses that favor negative language, e.g., imagine what life would be like if you did not have electricity.

Figure 8:
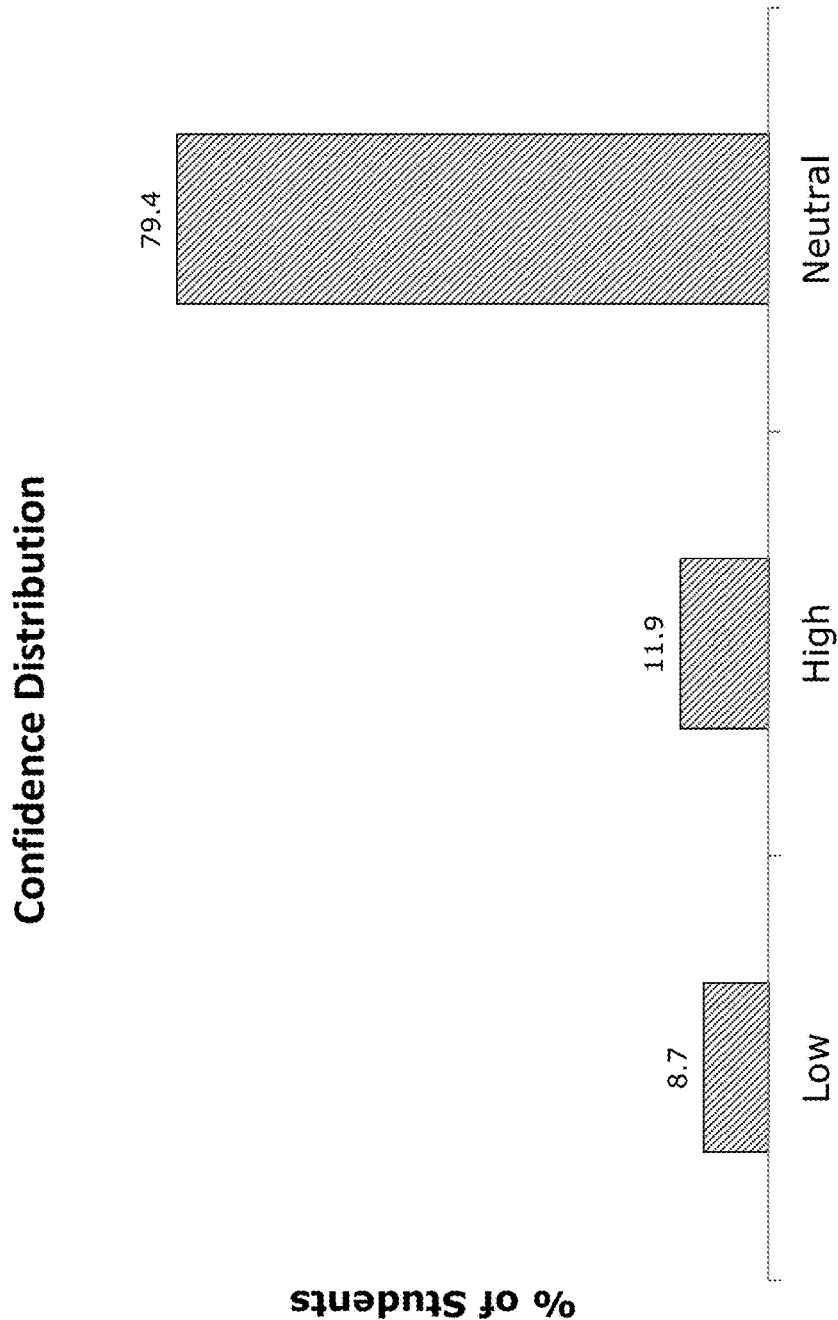
FIG. 8 is a bar graph illustrating distribution of confidence for student essays evaluated according to various aspects of the present disclosure.

The confidence distribution for the student essays is shown in FIG. 8. The neutral confidence category was strongly represented in the essay sample. This may be because the confidence metric is intended to identify strong examples of either high or low confidence, leading to a neutral selection in most cases.

Figure 9:
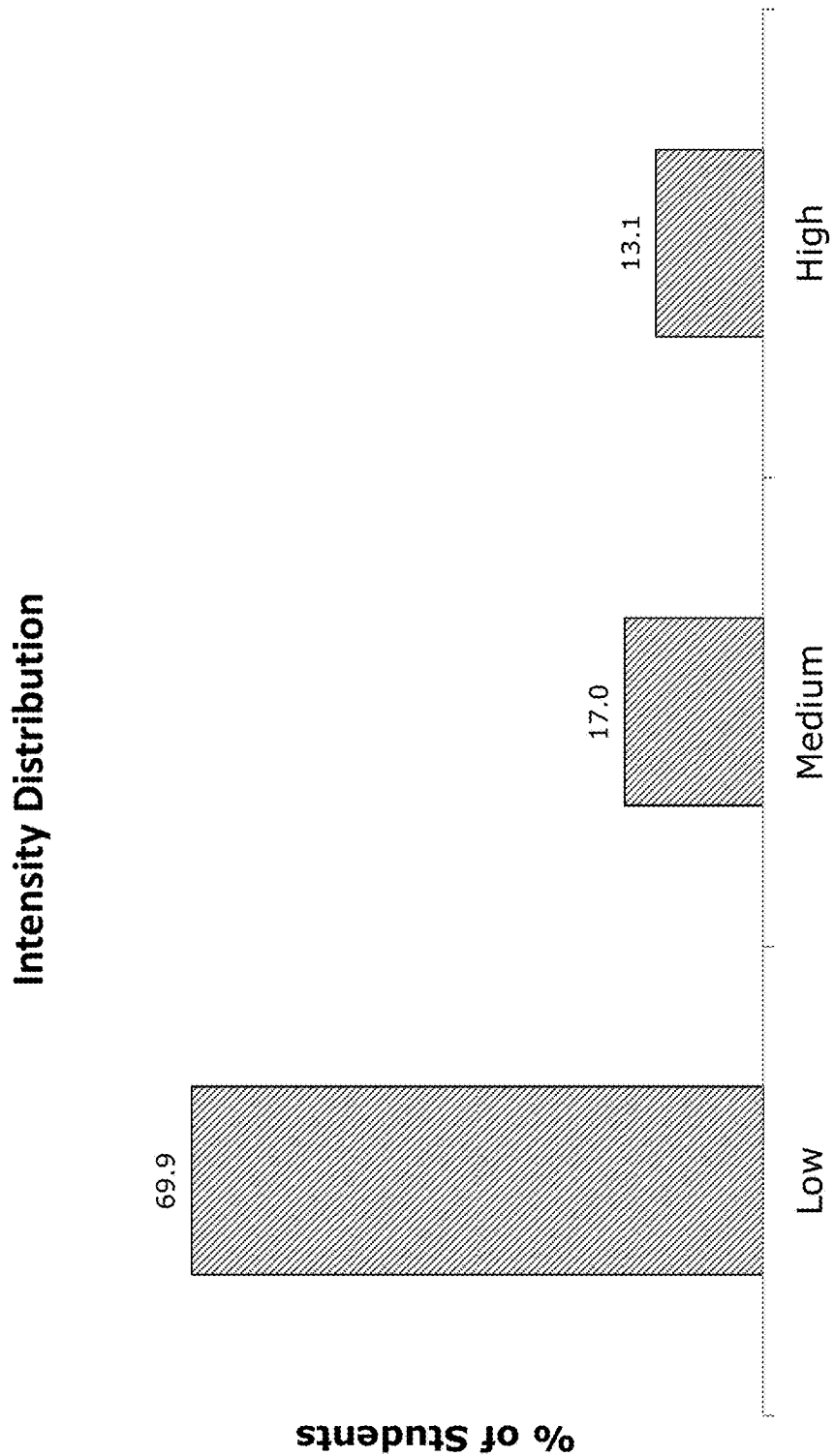
FIG. 9 is a bar graph illustrating distribution of intensity for student essays evaluated according to various aspects of the present disclosure.

The intensity distribution for the student essays is shown in FIG. 9. Most of the essays were labeled as having low intensity. The intensity metric is designed to target the small percent of essays that demonstrate high intensity and that may benefit from extra review or attention.

Figure 10:
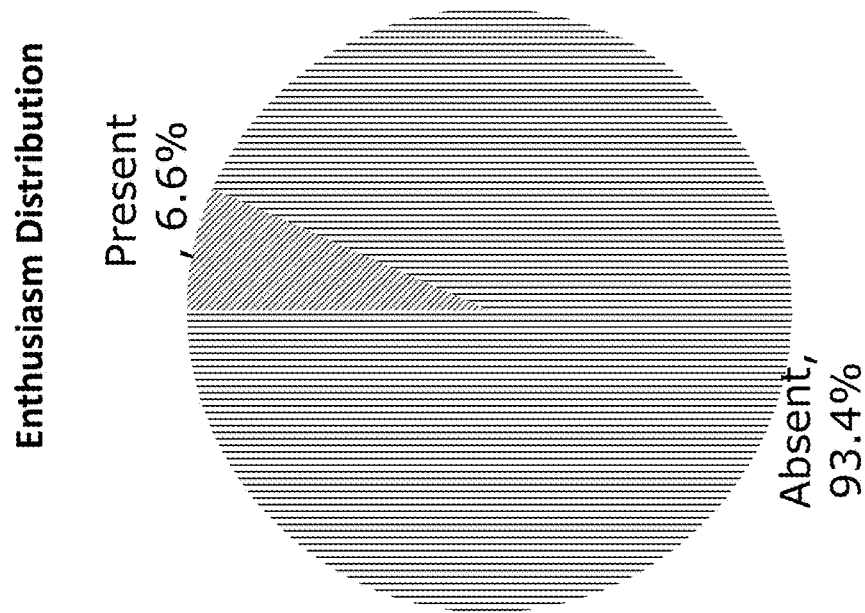
FIG. 10 is a pie chart illustrating distribution of enthusiasm for student essays evaluated according to various aspects of the present disclosure.

The enthusiasm distribution for the student essays is shown in FIG. 10. Few essays were labeled as having enthusiasm present. The enthusiasm metric was designed to capture strong language that indicates that the student is passionate about the subject matter.

Figure 11:
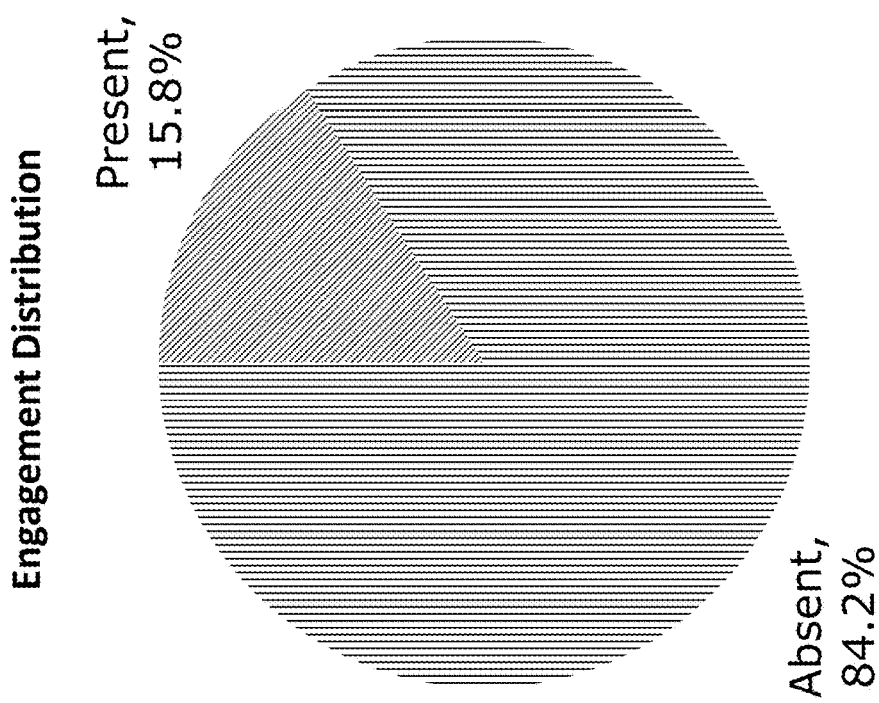
FIG. 11 is a pie chart illustrating distribution of engagement for student essays evaluated according to various aspects of the present disclosure.

The engagement distribution for the student essays is shown in FIG. 11. Relatively few essays were labeled as demonstrating engagement. Some of the more objective topics for the essays did not have much room for personal elements. As this writing assignment was more planned and structured, the students may have chosen to take a more academic tone.

Student Insights

The data obtained from the study was used to identify patterns and trends in the student scores. Trends in student analytic scores as related to testing level and age, correlations across student analytic metrics, and differences between the scores for the strongly performing A Better Chance (ABC) students and the overall sample of essays were investigated.

The testing level of each student was compared with the student analytic scores to demonstrate student growth across metrics throughout the students' educational career. Testing level 1 corresponded to grades 3-4, level 2 corresponded to grades 5-6, level 3 corresponded to grades 7-8, level 4 corresponded to grades 9-10, and level 5 corresponded to grades 11-12.

Figure 12:
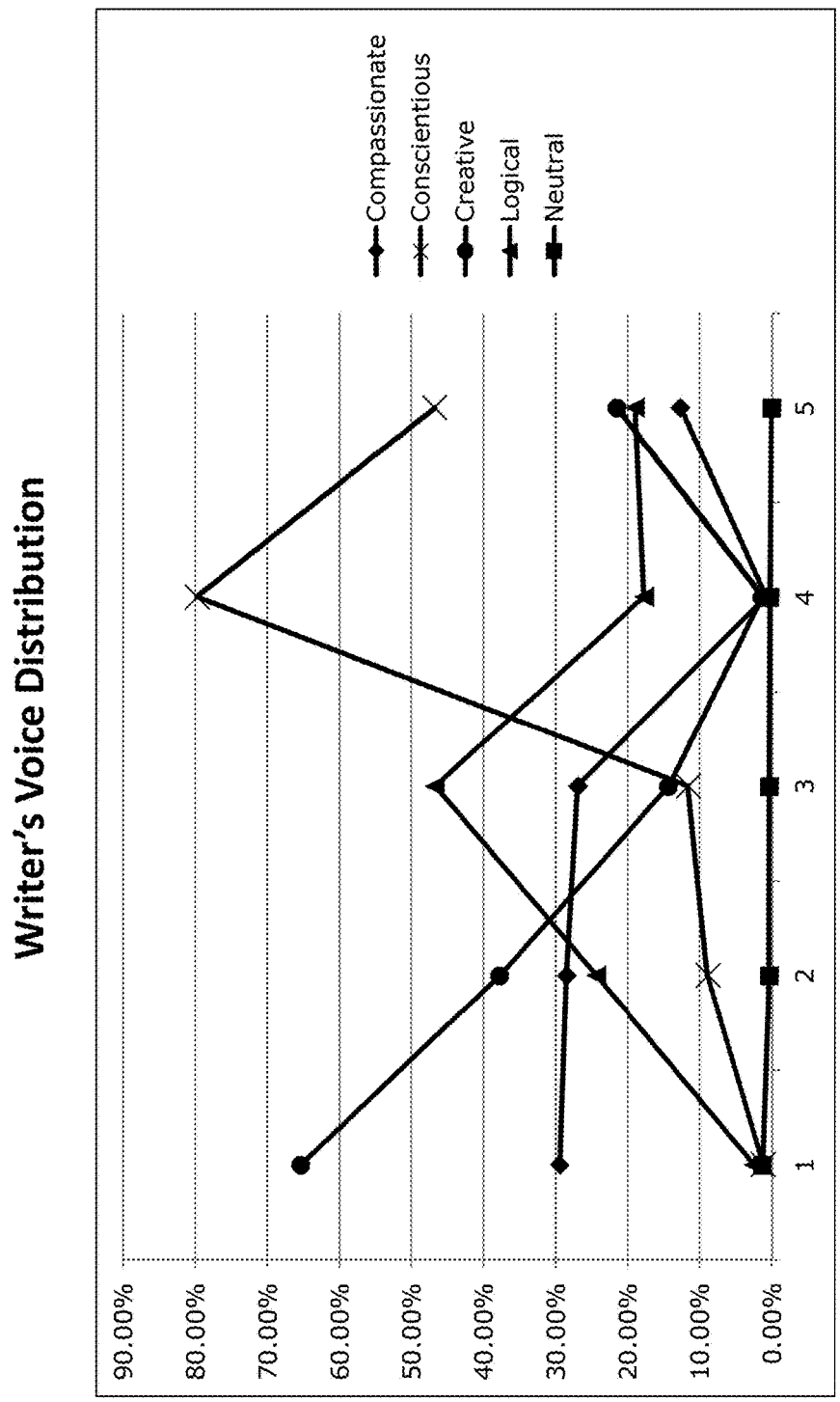
FIG. 12 is a graph illustrating distribution of writer's voice across different testing levels according to various aspects of the present disclosure.

FIG. 12 illustrates the distribution of writer's voice across the different testing levels. The frequency of the conscientious writer's voice increased dramatically as testing level increased, while the creative writer's voice decreased over time. This may be because students begin to structure their arguments around values and reasoning as their voices mature.

Figure 13:
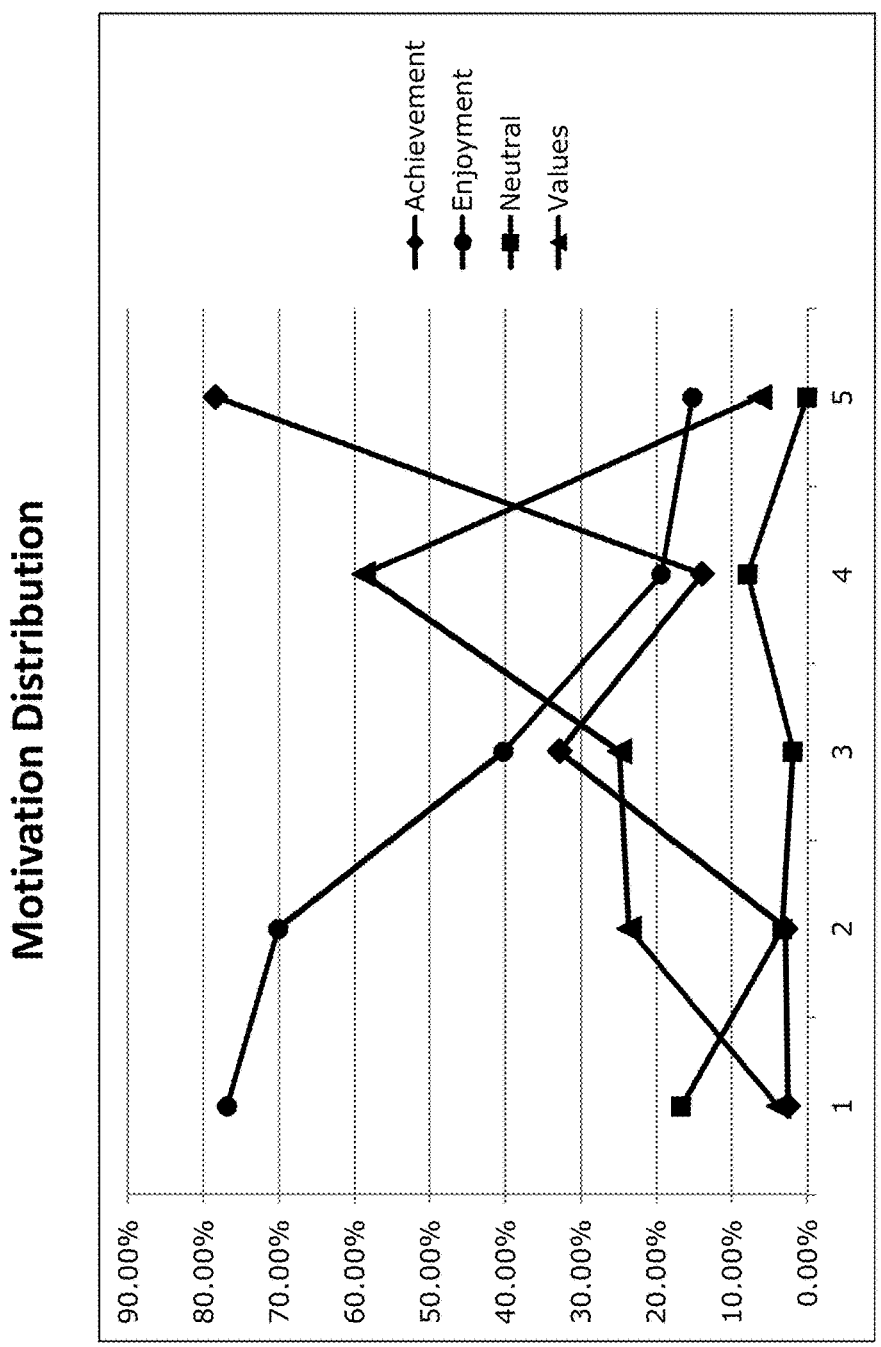
FIG. 13 is a graph illustrating distribution of motivation across different testing levels according to various aspects of the present disclosure.

FIG. 13 illustrates the distribution of student motivation across the different testing levels. The frequency of achievement as student motivation increased as testing level increased, while enjoyment decreased over time.

Some pairs of student analytic metrics demonstrated strong correlations, suggesting that these non-cognitive attributes could be linked. Strong correlations were found between a student's outlook and his or her tendency to express enthusiasm or high intensity.

Figure 14:
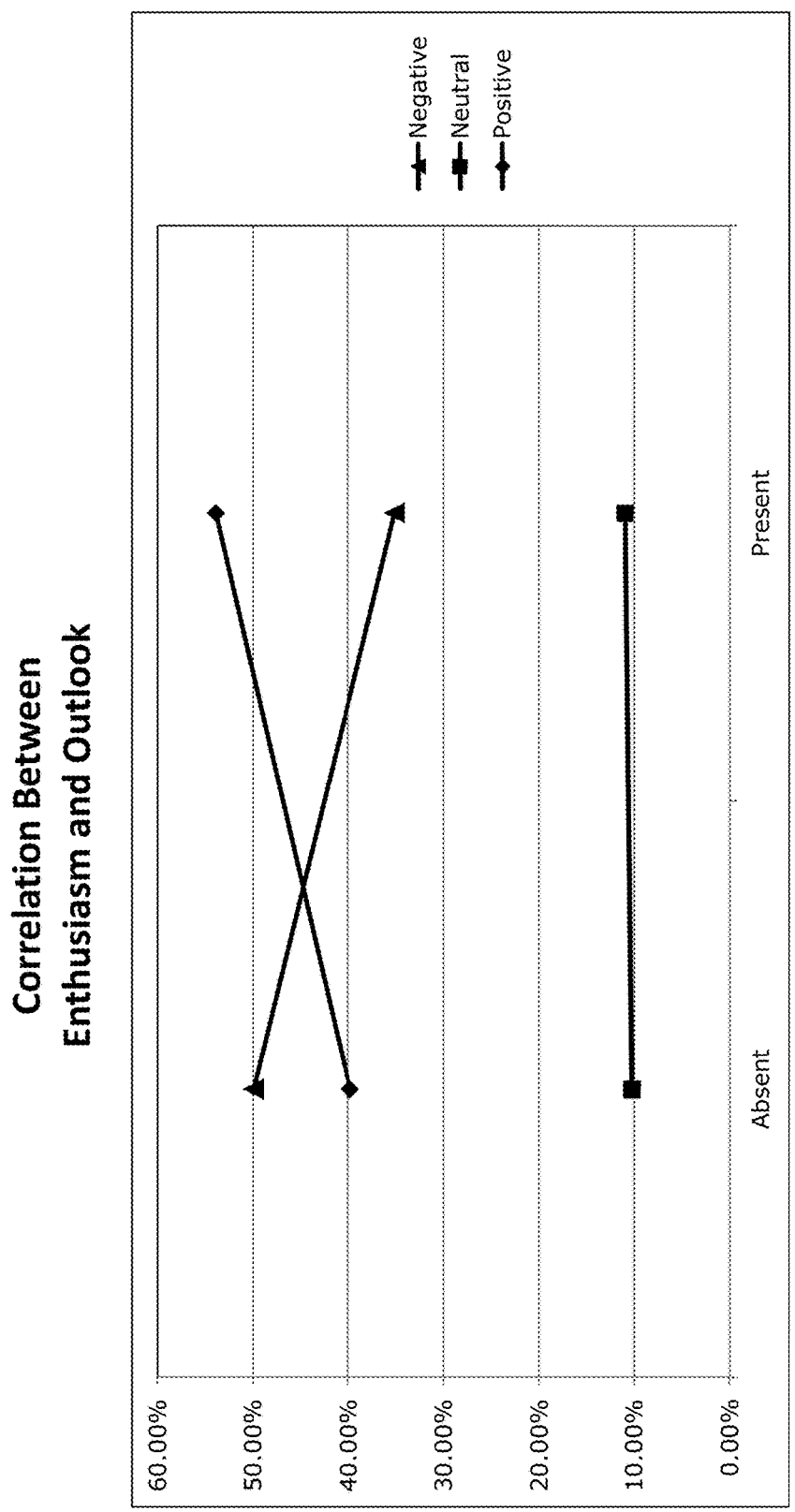
FIG. 14 is a graph illustrating the correlation between enthusiasm and outlook according to various aspects of the present disclosure.
Figure 15:
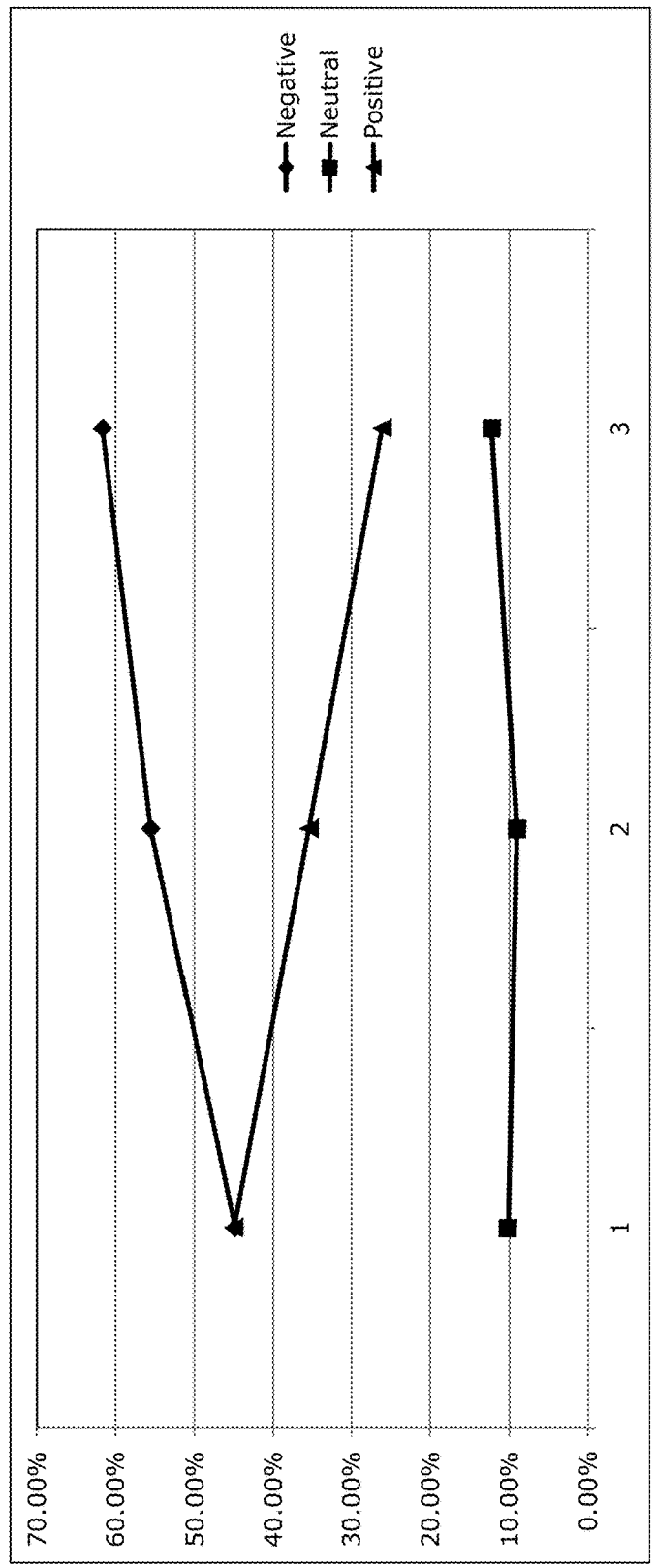
FIG. 15 is a graph illustrating the correlation between intensity and outlook according to various aspects of the present disclosure.

FIG. 14 illustrates how enthusiasm correlated with outlook. A positive outlook was associated with the presence of enthusiasm, while a negative outlook was associated with the absence of enthusiasm. FIG. 15 illustrates how intensity (1 denotes low, 2 denotes medium, and 3 denotes high) correlated with outlook. A negative outlook was associated with high intensity, and a positive outlook was associated with a low intensity.

A sample of essays from students accepted into the ABC program was analyzed. Multiple essays per student were analyzed to identify a holistic view of the non-cognitive attributes of each ABC student. The scores for each essay were compared to overall ABC student scores with consistent results. Interesting differences were found between the scores in the overall sample and the sample of ABC essays.

Results of the comparison in motivation between the ABC students and the overall sample are provided in FIG. 16. The ABC students were shown to be primarily motivated by achievement, while the main sample of essays demonstrated a strong lean towards the enjoyment motivation.

Results of the comparison in outlook between the ABC students and the overall sample are provided in FIG. 17. The ABC students had a much higher average positive outlook than the overall sample of students.

Results of the comparison in confidence between the ABC students and the overall sample are provided in FIG. 18. The ABC students demonstrated slightly higher overall confidence and less low confidence in their essays than the overall sample.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A system adapted to evaluate a written essay and provide teaching instructions for an online course, comprising:
    a server comprising a processor and a non-transitory computer readable medium operably coupled thereto, the computer readable medium comprising a plurality of instructions stored in association therewith that are accessible to, and executable by, the processor, where the plurality of instructions comprises:
    instructions that, when executed, connect the processor to an educational service provider server via a network to receive an essay by a student;
    instructions that, when executed, convert the essay to digital text format;
    instructions that, when executed, determine keywords, terms, and phrases that are relevant to at least one student metric;
    instructions that, when executed, build a linguistic-based psychological behavioral model by validating individual algorithms that evaluate student essays on the at least one student metric, wherein the linguistic-based psychological behavioral model comprises a plurality of validated individual algorithms;
    instructions that, when executed, instruct a scoring processor to access one or more libraries storing the keywords, terms, and phrases, and apply the linguistic-based psychological behavioral model to the text of the essay to output a score for the at least one student metric, wherein the at least one student metric comprises a personality type of the student associated with the essay, and wherein the linguistic-based psychological behavioral model is configured to detect a density of the keywords, terms, and phrases in the essay for each of the at least one student metric and to assign a binary or scaled score based on the stored keywords, terms, and phrases;
    instructions, that when executed, identify the personality type of the student based on the assigned binary or scaled score;
    instructions that, when executed, create a student profile based on personality type of the student;
    instructions that, when executed, provide, to an instructor on a display device, teaching instructions for the online course regarding how to engage with the student regarding writing, wherein the teaching instructions are based on the personality type of the student;
    instructions, that when executed, receive a grade for the essay;
    instructions, that when executed, correlate the teaching instructions with the grade;
    instructions that, when executed, retrieve one or more previous assessments of the student from a data storage device;
    instructions, that when executed, aggregate the assigned binary or scaled score with the one or more previous assessments of the student; and
    instructions, that when executed, update the student profile and the teaching instructions based on the aggregation of the assigned binary or scaled score and previous assessments and the correlation of the teaching instructions with the grade.

2. The system of claim 1, wherein the assigned binary or scaled score indicates a level of the at least one student metric, or the presence or absence of the at least one student metric.

3. The system of claim 1, wherein the at least one student metric further comprises writer's voice, motivation, outlook, confidence, intensity, enthusiasm, engagement, or a combination thereof.

4. The system of claim 3, wherein the scaled score for writer's voice comprises compassionate, logical, conscientious, or creative; the scaled score for motivation comprises enjoyment, achievement, or values; the scaled score for outlook comprises strongly positive, positive, weakly positive, neutral, weakly negative, negative, or strongly negative; the scaled score for confidence comprises low, neutral, or high; the score for intensity comprises low, medium, or high; the scaled score for enthusiasm comprises present or absent; the scaled score for engagement comprises present or absent; or any combination thereof.

5. The system of claim 3, further comprising instructions that, when executed, output a student profile comprising a first and second writer's voice, a student profile comprising a first and second motivation, or both.

6. The system of claim 1, further comprising instructions that, when executed, aggregate scores for a student or for an essay.

7. The system of claim 1, further comprising instructions that, when executed, display the assigned binary or scaled score to a school, the student, or the instructor.

8. The system of claim 1, further comprising instructions that, when executed, identify patterns in scores for the at least one student metric for different students.

9. The system of claim 8, wherein the patterns indicate trends in scores related to age, correlations across different student metrics, one or more differences in different student populations, or any combination thereof.

10. The system of claim 1, further comprising instructions that, when executed, use the grade and the at least one student metric to predict a student outcome.

11. The system of claim 1, wherein the personality type comprises thoughts, opinions, reactions, or emotions.

12. The system of claim 1, wherein the teaching instructions regarding how to engage with the student regarding writing comprise communicating express expectations.

13. The system of claim 1, wherein the teaching instructions regarding how to engage with the student regarding writing comprise providing the student with a linear process.

14. A method for evaluating a written essay and providing teaching instructions for an online course, which comprises:

connecting, by a processor, to an educational service provider server via a network to receive the essay by a student;

determining, by the processor, keywords that are relevant to at least one student metric;

building, by the processor, a linguistic-based psychological behavioral model by validating individual algorithms that evaluate student essays on the at least one student metric, wherein the linguistic-based psychological behavioral model comprises a plurality of validated individual algorithms;

accessing, by the processor, one or more libraries storing the keywords;

identifying, by a processor, the keywords in text of the essay associated with the at least one student metric based on the stored keywords, wherein the at least one student metric comprises personality type of the student associated with the essay;

outputting, by a processor, a score for the essay, wherein the score includes the personality type of the student, using the linguistic-based psychological behavioral model;

providing, by the processor to an instructor on a display device, one or more teaching instructions for the online course regarding how to engage with the student regarding writing, wherein the teaching instructions are based on the personality type of the student;

receiving, by the processor, a grade for the essay;

correlating, by the processor, the teaching instructions with the grade;

retrieving, by the processor, one or more previous assessments of the student from a data storage device;

aggregating, by the processor, the score with the one or more previous assessments of the student; and updating, by the processor, a profile of the student and the teaching instructions based on the aggregation of the score and previous assessments and the correlation of the teaching instructions with the grade.

15. The method of claim 14, wherein the at least one student metric further comprises writer's voice, motivation, outlook, confidence, intensity, enthusiasm, engagement, or a combination thereof.

16. The method of claim 15, wherein the score for writer's voice comprises compassionate, logical, conscientious, or creative; the score for motivation comprises enjoyment, achievement, or values; the score for outlook comprises strongly positive, positive, weakly positive, neutral, weakly negative, negative, or strongly negative; the score for confidence comprises low, neutral, or high; the score for intensity comprises low, medium, or high; the score for enthusiasm comprises present or absent; the score for engagement comprises present or absent; or any combination thereof.

17. The method of claim 15, which further comprises generating a visual display of the score to a school, the student, or the instructor.

18. The method of claim 15, which further comprises aggregating scores for one student or for an essay.

19. The method of claim 15, which further comprises identifying patterns in scores for the at least one student metric for different students.

20. The method of claim 14, which further comprises predicting a student outcome based on the grade and the at least one student metric.

21. A system adapted to evaluate a written essay and provide teaching instructions for an online course, which comprises:

a storage device storing a non-transitory computer readable program; and a processor executing the non-transitory computer readable program comprising:

a data processor adapted to:

connect to an educational service provider server to receive an essay by a student, convert the essay to digital text format, determine keywords, terms, and phrases that are relevant to at least one student metric, and build a linguistic-based psychological behavioral model by validating individual algorithms that evaluate student essays on the at least one student metric, wherein the linguistic-based psychological behavioral model comprises a plurality of validated individual algorithms;

a scoring processor adapted to:

access one or more libraries storing the keywords, terms, and phrases, and apply the linguistic-based psychological behavioral model to text of the essay to output a score for the at least one student metric and create a student profile based on the at least one student metric, wherein the at least one student metric comprises a personality type of the student associated with the essay and wherein the linguistic-based psychological behavioral model is configured to detect a density of the keywords, terms, and phrases in the essay for each of the at least one student metric and to assign a binary or scaled score based on the stored keywords, terms, and phrases, receive a grade for the essay, correlate teaching instructions for the online course regarding how to engage with the student regarding writing with the grade, wherein the teaching instructions are based on the personality type of the student, retrieve one or more previous assessments of the student from a data storage device, aggregate the assigned binary or scaled score with the one or more previous assessments of the student, and update the student profile and the teaching instructions based on the aggregation of the assigned binary or scaled score and previous assessments of the student; and a display processor adapted to display the assigned binary or scaled score and provide, to an instructor on a display device, the updated teaching instructions.

22. The system of claim 21, wherein the at least one student metric further comprises writer's voice, motivation, outlook, confidence, intensity, enthusiasm, engagement, or a combination thereof.

23. The system of claim 22, wherein the scaled score for writer's voice comprises compassionate, logical, conscientious, or creative; the score for motivation comprises enjoyment, achievement, or values; the scaled score for outlook comprises strongly positive, positive, weakly positive, neutral, weakly negative, negative, or strongly negative; the scaled score for confidence comprises low, neutral, or high; the scaled score for intensity comprises low, medium, or high; the scaled score for enthusiasm comprises present or absent; the scaled score for engagement comprises present or absent; or any combination thereof.

24. The system of claim 21, wherein the personality type comprises thoughts, opinions, reactions, or emotions.

* * * * *